July 13, 1926.

D. J. LEWIS

VENTILATOR

Filed March 11, 1926

1,592,667

INVENTOR
David J. Lewis
BY
John O. Siefert
HIS ATTORNEY

Patented July 13, 1926.

1,592,667

UNITED STATES PATENT OFFICE.

DAVID J. LEWIS, OF SHARON, PENNSYLVANIA.

VENTILATOR.

Application filed March 11, 1926. Serial No. 93,896.

This invention relates to ventilators particularly adapted for use in connection with vehicles, such as closed bodies of automobiles, to be mounted in a window frame whereby due to the movement of the vehicle an air flow exterior of the vehicle sets up a circulation of air within the vehicle body and causes the withdrawal of air therefrom. The invention relates particularly to a type of ventilator for this purpose wherein a flat plate is adapted to be mounted in an opening in a window frame of a vehicle body between the frame and the glass with a channel plate united therewith to be at the outside of the vehicle with the opposite ends open and in communication with openings in the flat plate opening to the vehicle body, and it is the object of the invention to provide improved means for uniting the plates from which the ventilator is formed into an integral structure, and which means is also arranged to serve as a bifurcation for the engagement of the partially opened window, to means to secure the ventilator in position in the window frame, to provide an adjustable ventilator to adapt the same to windows of different widths, and to means to render the ventilator ineffective to function to withdraw air from the vehicle body.

With the foregoing objects in view I have illustrated in the drawing accompanying and forming a part of this specification an embodiment of the invention wherein Figure 1 is a perspective view of a portion of the closed body of an automobile with the door for the opening leading into the vehicle in open position and showing the ventilator applied to the window of the door.

Figure 1:
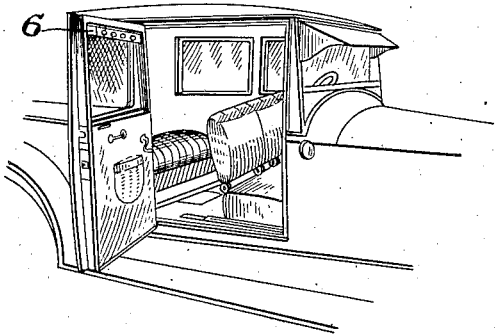
Figure 2:
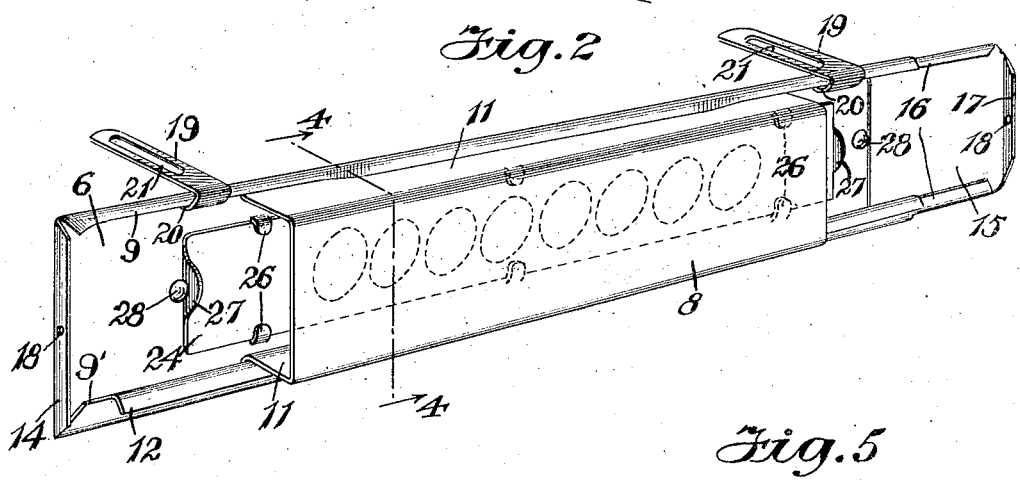
Figure 2 is a perspective view of the ventilator partly broken away, to show the arrangement of a shutter relative to the openings in the one plate of the ventilator to open the said openings to the vehicle body to variable extent or to shut off said openings to render the ventilator ineffective to function to draw air from the vehicle body.
Figure 3:
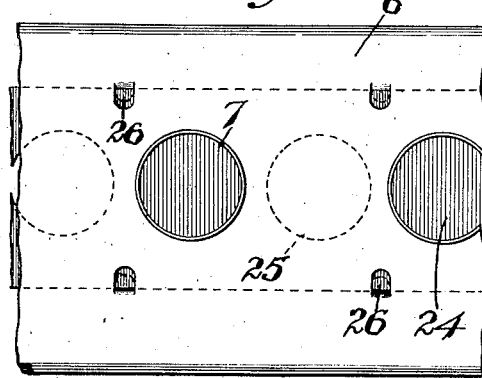
Figure 3 is an elevational view of a portion of the ventilator looking at the rear of Figure 2 to show the mounting of the shutter.
Figure 4:
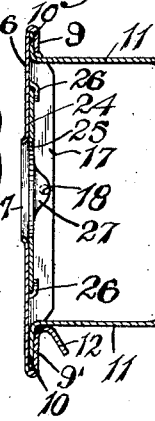
Figure 4 is a cross sectional view taken on the line 4—4 of Figure 2 looking in the direction of the arrows.
Figure 5:
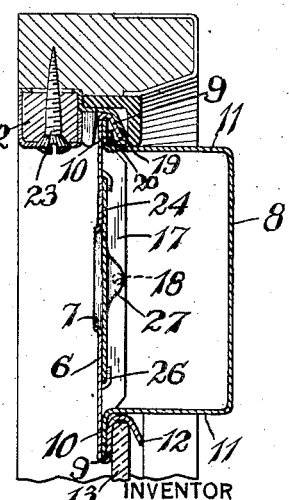
Figure 5 is a view similar to Figure 4 and showing the manner of mounting the ventilator in a window frame and showing the partly opened window or glass in relation thereto.

In carrying out the invention there is provided a flat plate 6 having openings 7 therein, and a plate 8 bent to channel shape in cross section and of less length than the plate 6, said plates preferably being of metal. One of the plates is arranged with flanges at the longitudinal edge portion to be engaged over the longitudinal edges of the other plate and clinched thereto to unite the plates in juxtaposed relation whereby the channel plate in cooperation with the flat plate forms an air passage open at opposite ends with which the openings 7 are in communication, one of the flanges for uniting the plates also being arranged to serve as a window engaging bifurcation. In the present instance the longitudinal edge portions of the plate 6 are arranged with flanges 9, 9' and engaged laterally flanged portions 10 of the opposite walls 11 of the channel plate and in the region where said flanges 9, 9' engage the flanges 10 are clinched thereto as clearly shown in Figure 4, thereby rigidly uniting the two plates together. The flange 9' is in the nature of a double flange in that it is bent upon itself or flanged laterally, as at 12, to form a bifurcation for the engagement of a window or glass 13, as shown in Figure 5. The one end of the plate 6 is flanged laterally, as shown at 14, and to attach the ventilator to windows of variable width the plate 6 is arranged at the opposite end with an extensible plate member 15 having opposite longitudinal edges 16 flanged or bent over upon the plate to add rigidity thereto. This extension plate is slidably mounted between the plate 6 and the plate flanges 9, 9' and supported by the latter for which purpose said flanges at the end of the channel plate are slightly spread or spaced laterally of the plate 6 and whereby the plate extension 15 may be adjusted longitudinally relative to said plate 6. The end of the plate extension is also arranged with a laterally extending flange 17. The ventilator constructed as described is engaged in the window frame, the window or glass 13 first being lowered, with the channel plate at the outside when the plate extension 15 is adjusted so that the flange 17 thereof and the plate flange 14 lie in contiguous relation to the bottom of the guideway in which the window slides when the ventilator is secured in said position by securing means, such as screws, engaged in perforations 18 in the plate flanges 14, 17 and screwed into the window frame. In this position the window 13 is raised so that the edge engages in the bifurcation 12, and due to the resiliency of the material from which the ventilator is constructed it will slightly give or yield and the window may be moved firmly into engagement therewith assuring the parts from vibrating and chattering due to the movement of the vehicle.

As a further means to firmly secure the ventilator in the window frame it may be provided with a pair of clips 19 having one end arranged as a hook 20 to be engaged between the spread portion of the flange 9, in which the plate extension 15 slightly engages. The other clip is engaged in a similar manner upon the plate flange 9, at the opposite end of the channel plate 8 for which purpose said flange is also slightly spaced or spread from the plate 6 at said end of the channel plate. The clips have elongated openings 21 therein for the engagement of securing means, such as screws. By the arrangement of mounting the clips upon the plate flange 9 the clips are not only adapted to have movement about said flange but also adjustment in a direction longitudinally of the plate. In utilizing the clips as a securing means the molding 22 (Figure 5) forming one side wall of the window engaging recess of the window frame and usually secured in position by screws 23 is removed to position the ventilator in the window frame, and after the ventilator has been positioned in the window frame the clips are bent as shown in said Figure 5 to be engaged below the molding 22 when the molding is again secured in position by its securing screws 23, said screws passing through the clip openings 21, said openings being elongated so that they may be readily positioned relative to the screws 23. Invariably the molding securing screws in different makes of automobiles are at different distances apart and by the mounting of the clips upon the plate flange 9 to have adjustment longitudinally of the plate they may be variably positioned relative to said securing screws. The flange 9 is of a width substantially the same as the depth of the window engaging groove so that the outer wall of said groove will be in engagement with the side 11 of the channel plate which is uppermost, and by this arrangement moisture, such as rain in inclement weather will be shed from the top of the ventilator. Also by the arrangement of the window engaging bifurcation 12 rain will be shed therefrom and prevented from entering between the window and ventilator. With the ventilator so mounted as the vehicle moves forward there will be a rush of air into the forward end of the passage formed by the channel plate and out from the rear thereof, thus rush of air causing a drawing of air through the openings 7 from the vehicle body, setting up a circulation of the air in the vehicle body and also inducing fresh air to flow therein.

In cold weather it may be desirable to render the ventilator ineffective to function to draw air from and induce air to flow into the vehicle body. For this purpose means is provided to close the openings 7, or to open the same to a variable extent. This means comprises a shutter in the form of a plate 24 having openings 25 mounted upon the side of the ventilator plate 6 to have longitudinal sliding adjustment. To slidably mount the shutter portions of the material of the plate 6 are stamped therefrom at opposite sides of the openings 7 and adjacent the longitudinal marginal portions of the plate, said portions being flanged laterally to form lips or tangs 26 and arranged so that the opposite lips will extend in a direction toward each other or inward from the edges of the plate. The shutter plate is engaged between said lips and the plate 6 to lie contiguous to the latter. By this arrangement the shutter may be adjusted upon the lips so that the openings therein will be in register with the openings 7, or only in partial register therewith, or adjusted so that the material of the plate between the openings will come in register with the openings in plate 6 and thus close the same. To facilitate the adjustment of the shutter plate the opposite ends are flanged laterally, as at 27, to form finger grips. To limit the movement or adjustment of the shutter plate stops in the form of pins 28 are fixed in predetermined position in the plate 6 at opposite ends of the shutter plate.

Having thus described my invention I claim:—

1. In a ventilator, a flat plate arranged with openings, and a plate of channel shape in cross section the longitudinal edge portions of one plate being flanged and engaged over the longitudinal edges of the other plate to unite the plates in juxtaposed relation and form a longitudinal air passage open at opposite ends and with which the perforations in the one plate communicate, and one of said flanges arranged as a window engaging bifurcation.

2. In a ventilator, a flat plate arranged with openings, and a plate of channel shape in cross section having a longitudinal edge portion flanged laterally and juxtaposed to a face of the flat plate, and the longitudinal edge portions of the flat plate flanged over and clinched to said laterally extending flanges to unite the plates to form an air passage open at both ends with the openings in the flat plate in communication therewith, and one of said flanges of the flat plate arranged as a window engaging bifurcation.

3. In a ventilator as claimed in claim 2, a second flat plate slidably mounted upon and having openings of the same area as the openings in the first flat plate, said second plate being adapted to be adjusted with the openings therein in register with the openings in the first plate or with the material of said plate between the openings positioned relative to and closing the openings in said first plate.

4. A ventilator as claimed in claim 2, wherein the flat plate is arranged with opposed lips stamped from and bent laterally of said plate, and a second flat plate slidably mounted between said lips and the first flat plate in contiguous relation to the latter, said second plate having openings of the same area as the openings in the first plate and adapted to be adjusted with the openings in the plates in register or the material of the plates between the openings positioned relative to and closing the openings.

5. A ventilator as claimed in claim 2, wherein the flat plate has lips stamped therefrom at opposite sides of and extending in a direction toward the openings, a second flat plate having openings of the same area as the openings in the first plate slidably supported by said lips in contiguous relation to said first plate and adapted to be adjusted to position the openings in the plates in register or the material of the plates between the openings in register and closing the openings, the end of said second plate being flanged laterally to form finger grips, and stops fixed in said first plate to limit the adjustment of said second plate.

6. A ventilator as claimed in claim 2, wherein the channel plate is of less length than the flat plate, and the one clinching flange of the flat plate at opposite ends of the channel plate has mounting clips mounted thereon.

7. A ventilator as claimed in claim 2, wherein the channel plate is of less length than the flat plate and one of the uniting flanges is in spaced relation to the plate at opposite ends of the channel plate, and mounting clips for the ventilator engaged upon said spaced flanged portions to have adjustment longitudinally thereof.

8. A ventilator as claimed in claim 2, wherein one end of the flat plate is flanged laterally, and an extensible plate portion at the opposite end of and slidably engaging in the opposite flanges of said plate, and the end of said extensible plate portion flanged laterally.

Signed at city of Sharon in the county of Mercer and State of Pennsylvania this 24th day of February, 1926.

DAVID J. LEWIS.